United States Patent [19] [11] 4,103,851
Salmon [45] Aug. 1, 1978

[54] CONTINUOUS SPEED CHECKING PROCESS FOR A POWERED VEHICLE AND APPARATUS FOR CARRYING THE PROCESS INTO EFFECT

[75] Inventor: Jean P. Salmon, Sevran, France
[73] Assignee: Jeumont-Schneider, Puteaux, France
[21] Appl. No.: 753,616
[22] Filed: Dec. 22, 1976
[30] Foreign Application Priority Data
Dec. 24, 1975 [FR] France .................. 75 39693
[51] Int. Cl.² .................................. B61L 3/16
[52] U.S. Cl. .................. 246/63 C; 246/182 C; 246/187 B
[58] Field of Search ........... 246/182 A, 182 B, 182 C, 246/187 B, 167 R, 177, 63 R, 63 C; 235/150.2, 150.24; 361/242

[56] References Cited
U.S. PATENT DOCUMENTS

| | | | |
|---|---|---|---|
| 3,253,143 | 5/1966 | Hughson | 246/187 B |
| 3,482,090 | 12/1969 | Wilcox | 246/182 C |
| 3,794,833 | 2/1974 | Blazek | 246/187 B |
| 3,800,139 | 3/1974 | Clark | 246/182 C |
| 3,967,801 | 7/1976 | Baughman | 246/187 B |

*Primary Examiner*—Trygve M. Blix
*Assistant Examiner*—Reinhard J. Eisenzopf
*Attorney, Agent, or Firm*—Bacon & Thomas

[57] ABSTRACT

A method and apparatus for continuous supervision of both a vehicle's speed and deceleration over a track, provides overspeed detection in one set of conditions and under-deceleration detection under other conditions. The apparatus does not provide automatic driving, but is used in conjunction with either automatic driving equipment or manual driving of the vehicle. The process involved comprises the steps of transmitting to the vehicle an exit speed, defined as a speed limit to be observed on leaving a particular block section of the track upon which the vehicle travels. The exit speed is stored in the vehicle, and comparisons are made with a stored exit speed for the preceding block section. The process further includes a continuous measurement of both actual speed and deceleration of the vehicle, and provides for initiation of emergency braking dependent upon the results of the comparison and measurement steps. Specifically, where the present exit speed equals or exceeds the exit speed of the preceding section, emergency braking is initiated subsequent to a predetermined delay where the actual speed exceeds the exit speed for the particular block section. Where the present exit speed is less than the exit speed for the preceding section, emergency braking is initiated when the measured deceleration is less than a predetermined deceleration.

5 Claims, 3 Drawing Figures

CONTINUOUS SPEED CHECKING PROCESS FOR A POWERED VEHICLE AND APPARATUS FOR CARRYING THE PROCESS INTO EFFECT

This invention relates to a continuous speed checking process for a powered vehicle under automatic or manual invigilation and to apparatus for performing the process and therefore used as an essential adjunct for the automatic driving installation controlling the vehicle.

The invention is of use more particularly for rail vehicles.

In the existing automatic driving installations such as are used for underground trains, equipment is provided in duplicate or triplicate to achieve the required safety level, since the problems to be solved are so complex that it is impossible to devise a single installation which in railway thinking would be completely fail-safe. The installations therefore become elaborate and their reliability suffers. If the automatic driving equipment fails, the vehicle has to be driven manually — i.e., by untrained operators who no longer have available to them all the means of information normally associated with manual driving alone. There is therefore a risk of traffic being slowed down considerably.

However, the invention solves the problem by having a single automatic driving equipment which is not of the fail-safe kind — and which is therefore simpler and more reliable than fail-safe equipment supervised by apparatus providing continuous supervision of vehicle speed and deceleration, the latter apparatus being completely independent of the automatic driving apparatus and, since it is less complex than the latter, being more economically possible to devise on a fail-safe basis. Another advantage of such supervision is that it remains operative in the event of a failure of the automatic driving equipment and it is an aid to proper manual driving, increasing the safety thereof.

Since any automatically controlled powered vehicle must return to its starting point, the track along which it travels is a closed loop which is normally divided into consecutive portions known as block sections.

In the process according to the invention:

The vehicle immediately upon entering any block section, has transmitted to it a limit speed with which it must comply at the exit from such section and which is called the "exit speed". This is accomplished by the following steps:

(1) The exit speed is stored in the vehicle driving cab.
(2) The exit speed is compared with the stored exit speed for the previous block section.
(3) The actual speed and actual deceleration of the vehicle are measured continuously.

In a first case in which the exit speed for the present block section is at least equal to the exit speed of the previous block section, emergency braking is initiated after a given delay when vehicle actual speed exceeds the exit speed of the existing block section.

In a second case in which the exit speed of the existing block section is less than the exit speed of the previous block section, emergency braking is initiated after a given delay when the actual deceleration of the vehicle becomes less than a given deceleration.

The apparatus for performing the process is distinguished in that it comprises on board the powered vehicle the following circuitry:

(1) Cab signal equipment receiving the information indicating the exit speed in each block section from fixed installations.
(2) A store for providing the exit speed of the previous block section.
(3) A comparator of the various exit speeds.
(4) An apparatus for measuring actual vehicle speed.
(5) An overspeed detector which is brought into operation under the control of the comparator in the first case mentioned.
(6) An apparatus for measuring vehicle actual deceleration.
(7) An under-deceleration detector which is brought into operation under the control of the comparator in the second case mentioned.
(8) Relays energized by the detectors to initiate vehicle braking.

The invention will be better understood if reference is made to an embodiment relating to a rail vehicle and to the accompanying drawings wherein.

Figure 1:
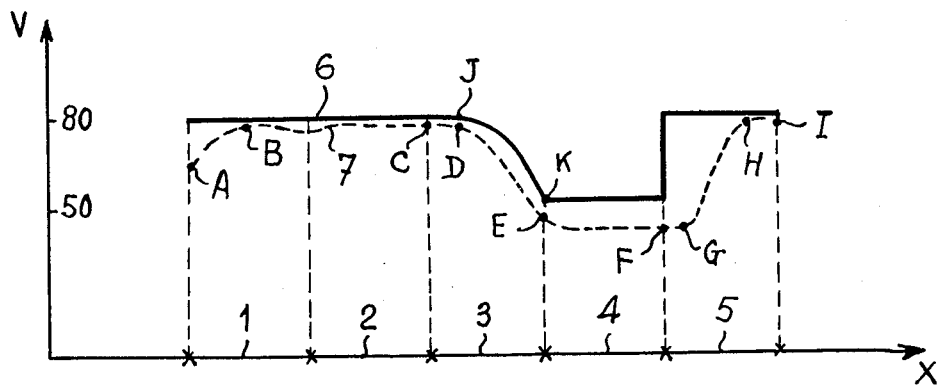
FIG. 1 shows the space-time curves for a powered vehicle passing through a number of block sections.

FIG. 1 shows 5 consecutive block sections 1 – 5. The maximum speeds which are permitted at the block section exits in the light of consideration of the track, vehicle braking ability, operating conditions etc. are 80 km/h for sections 1 – 3 and 5 and 50 km/h for section 4. The speeds V in km/h are plotted along the ordinate and the distances travelled X are plotted along the abscissa. A solid-line curve 6 indicates the permitted maximum speed at any position while a broken-line curve 7 represents vehicle running which may actually occur.

A vehicle driven automatically or manually and entering section 1 at place A at a speed below the permitted maximum of 80 km/h can accelerate up to position B where its speed is slightly below the permitted maximum. Its speed must thereafter be adjusted so as not to exceed the permitted maximum, the vehicle running in this way through section 2 as far entry C of block section 3. In block section 3 the vehicle receives information that the maximum permitted speed at the exit from block section 3 is 50 km/h; the vehicle must therefore decelerate by an amount greater than the value permitting, having due regard to some delay in braking (time taken to receive the information and time taken to apply the brakes) the required exit speed of 50 km/h to be reached at the end of section 3. This minimum deceleration corresponds to the portion JK of curve 6 in FIG. 1. Portion CD of curve 7 corresponds to the time taken to receive the information and actuate the brakes. The portion DE corresponds to actual braking and is disposed below the corresponding portion JK of curve 6.

In block section 4 the speed of the vehicle must then be controlled, as in section 2, so as not to exceed the set speed which in the present case is 50 km/h.

When the vehicle enters section 5 at point F of curve 7 it can accelerate between the points G and H up to the permitted maximum speed of 80 km/h, whereafter its speed must be adjusted between H and I so as not to exceed this figure.

During this procedure the continuous speed checking installation according to the invention acts as an overspeed detector in the zone ABC, then as an under-deceleration detector in the zone CDE and then as an overspeed detector again in the zone EFGHI.

Figure 2:
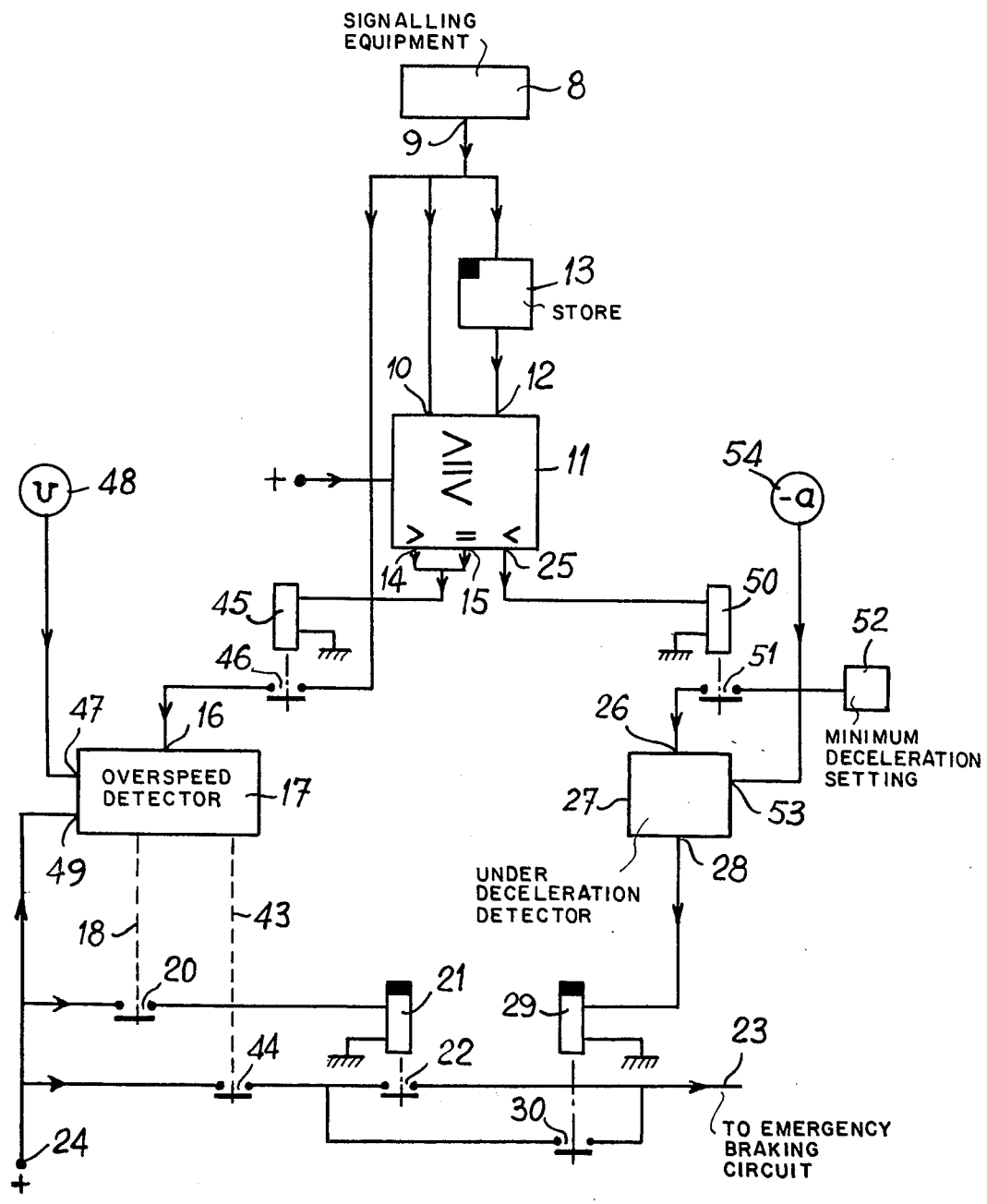
FIG. 2 is a view in block schematic form of the apparatus according to the invention.

FIG. 2 shows cab signalling equipment 8 which, immediately a section is entered, receives therein the information about the permitted maximum exit speed for such section. If such information is provided intermittently, means which are not shown in FIG. 2 are provided to make the information available continuously. Output 9 of equipment 8 is connected to the first input 10 of a comparator 11 and, by way of a store 13, to the second input 12 of comparator 11; the function of the store 13 is to output the exit speed of the previous section.

According to the relative values of the speeds at its inputs 10, 12, comparator 11 energizes either:

Output 14, if the speed at input 10 is above the speed at input 12, or

Output 15, if the speed at input 10 is equal to the speed at input 12, or

Output 25, if the speed at input 10 is below the speed at input 12.

The first two outputs 14, 15 energize the winding of a relay 45 whose normally open (no) contact 46 connects output 9 to the first input 16 of an overspeed detector 17. A second input 47 thereof is connected to a device 48 measuring vehicle actual speed v. A third input 49 of detector 17 is connected to a d.c. supply 24.

Figure 3:
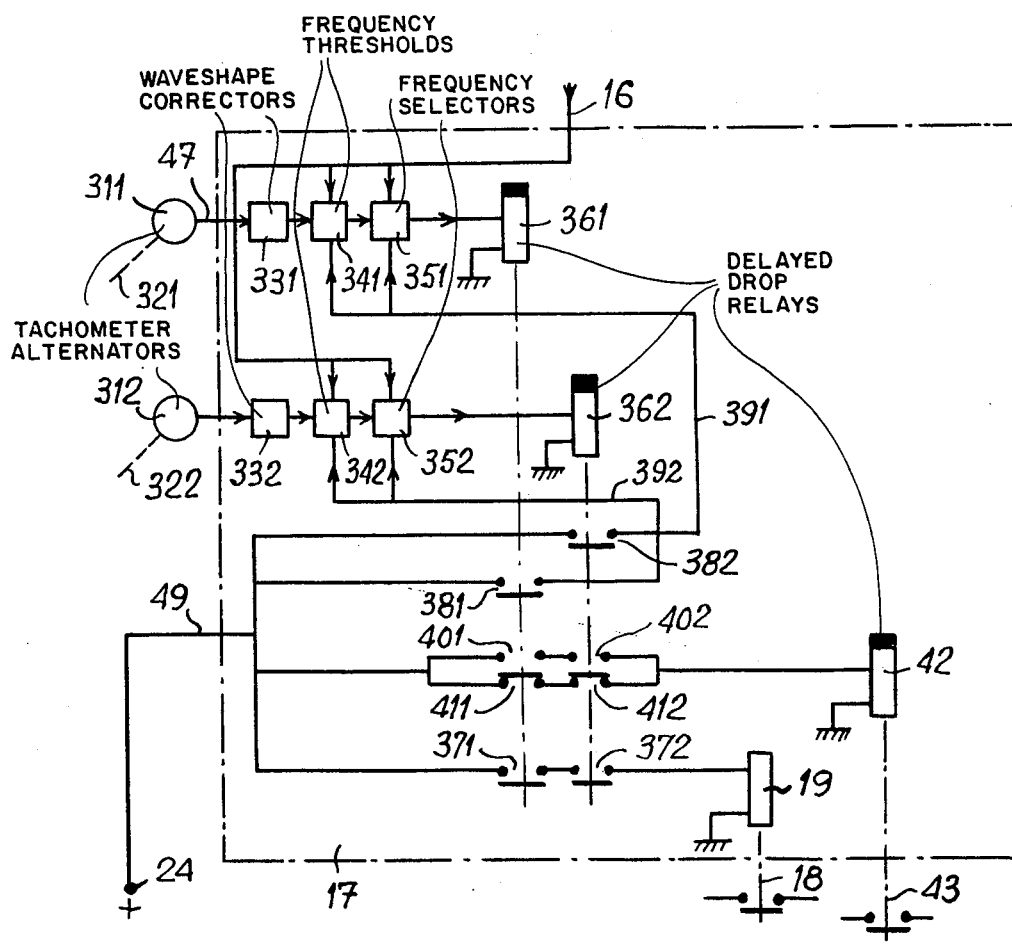
FIG. 3 is a block schematic view in greater detail of an overspeed detector.

Detector 17 operates an overspeed terminal relay 19 which is shown in FIG. 3 and whose moving system 18 and no contact 20 are a means of energizing a delayed drop relay, known as the delayed overspeed relay, from the d.c. supply 24. no contact 22 of relay 21 is disposed in an emergency braking circuit 23 energized by the supply 24. Detector 17 also operates the delayed drop relay 42 which can be seen in FIG. 3 and which is known as the "overspeed detection control relay"; the moving system 43 and no contact 44 of relay 42 control the emergency braking circuit 23.

A third output 25 of comparator 11 is connected to the winding of a relay 50 whose no contact 51 connects a device 52, which provides a minimum deceleration set value, to a first input 26 of an under-deceleration detector 27. A second input 53 of detector 27 is connected to a device 54 measuring actual vehicle deceleration — a.

Output 28 of detector 27 is connected to a delay drop relay 29 known as the "deceleration supervision relay" whose no contact 30 shunts contact 22.

FIG. 3 shows an overspeed detector having two detection channels each comprising consecutively a tachometer alternator 311, 312 driven by an axle 321, 322 of the vehicle, a wave shape corrector 331, 332, a frequency threshold 341, 342 and a frequency selector 351, 352, such selector outputting to the winding of a delayed drop relay 361, 362 having a two-way switching contact 401 - 411, 402 - 412 and known as the "overspeed relay". The contacts 401 - 411, 402 - 412, which are arranged for a correspondence proving, of the relays 361, 362 control the delayed drop relay 42.

Two other no contacts 371, 372 controlled by the relays 361, 362 respectively are connected in series for energization of relay 19 by supply 24.

Each overspeed relay 361, 362 of a detection channel has a no contact 381, 382 which closes to connect the d.c. supply 24 to the frequency threshold and frequency selector of the other detection channel, the contact 381 in accordance with the connection 392 and the contact 382 in accordance with the connection 391. Input 16 of detector 17 is connected to the frequency thresholds 341, 342 and to the frequency selectors 351, 352 of the two detection channels.

The continuous speed supervision apparatus according to the invention operates as follows: It uses a system for ground-to-vehicle transmission of a cab signal indicating to any vehicle entering a section the permitted maximum speed at the exit from such section.

Two cases may arise in operation. In the first case, the exit speed of a section is at least equal to the exit speed of the previous section, while in the second case the exit speed of a section is less than the exit speed of the previous section.

In the first case the cab signal equipment 8 (FIG. 2) transmits the new exit speed to input 10 of the comparator and the latter speed is compared with the exit speed of the previous section, the latter speed being stored in the store 13. Output 14 or output 15 of comparator 11 allows the exit speed information to be transmitted to input 16 by closure of contact 46 of relay 45.

In the case shown here, the device 48 in FIG. 2 for measuring actual vehicle speed is a tachometer alternator which is provided in duplicate for fail-safe reasons (FIG. 3). The two tachometer alternators 311, 322 are driven by two different axles 321, 322 of the vehicle and output signals whose frequency is proportional to vehicle speed. Such signals, after wave shape correction in 331 and 332, are applied to the frequency thresholds 341, 342 and frequency selectors 351, 352 in which their frequency is compared with a time base whose value is controlled by the exit speed information transmitted to input 16 of detector 17.

The frequency threshold diagrammatically represented by the integers 341, 342 basically comprises a capacitor which is discharged by each signal from the associated tachometer alternator 311 or 312 and which is recharged between signals by a constant-voltage supply through resistances whose value is controlled by the exit speed information transmitted to the detector input 16. The voltage across the capacitor is compared, in an operations amplifier operating as a bistable, with a reference voltage supplied via a resistive dividing network from the supply used for charging the capacitor.

If the time between two consecutive signals of the tachometer alternator is greater than the time taken by the voltage across the capacitor to reach the reference voltage, the voltage across the capacitor exceeds the reference voltage and changes over the operations amplifier, the same energizing the corresponding overspeed relay 361 or 362. Contacts 371, 372 stay closed. Relays 19, 21 are energized. No emergency braking occurs.

If, on the other hand, the time between two consecutive pulses of the tachometer alternator is less than the time taken by the voltage across the capacitor to reach the reference voltage, the capacitor voltage does not reach the reference voltage and the operations amplifier does not change its state. Relays 19, 21 do not pick up and contact 22 opens to initiate emergency braking.

The two relays 361, 362 are fail-safe relays. However, since the frequency thresholds 341, 342 are not fail-safe, their operation is supervised by providing after each of them a fail-safe frequency selector 351, 352. The same, which are disposed between the delay drop relay 361 or 362 and the frequency threshold 341 or 342, do not gate the signals output by the frequency threshold unless their frequency corresponds exactly to the exit speed transmitted to detector input 16.

Since both overspeed detection chains operate on a fail-safe basis, any malfunctioning likely to disturb operation but not impairing safety can be detected if the contacts 401, 411 and 402, 412 of the two relays 361, 362 are arranged in a correspondence proving. In such an arrangement any discrepancy between the operations of the relays leads, after a slight delay, to the dropping of the overspeed detection control relay 42, so that contact 44 opens to initiate emergency braking. A fault in either of the two detection channels can therefore be discovered.

The contacts 381, 382 of FIG. 3 are a means of compensating for inevitable adjustment differences between the two frequency thresholds 341, 342 and the frequency selectors 351, 352; such differences might result, in vehicles running near the prescribed maximum speed, in malfunctioning of the facility just described for correspondence proving.

Whenever any relay 361 or 362 of a detection channel operates, the dropping of its corresponding contact 381 or 382 alters the threshold adjustment of the other detection channel, the amplitude of such alteration being greater than the adjustment difference between the two channel thresholds.

In the second case — i.e., in which the exit speed information transmitted by apparatus 8 to comparator input 10 is less than the exit speed of the previous block section as transmitted to 12 — output 25 of comparator 11 operates relay 50. Since outputs 14 or 15 no longer supply relay 45, the overspeed detector does not operate and contact 22 opens. If actual vehicle deceleration transmitted by device 54 is less than the minimum deceleration, output 28 of detector 27 de-energizes the winding of delayed relay 29 after a given delay. The previously closed contact 30 opens to initiate emergency braking.

The under-deceleration detector used in the apparatus according to the invention is a mercury accelerometer in the form of an insulated U-tube. It is part-full of mercury and has contacts for making or breaking, for both directions of vehicle running, a circuit with the mercury column when the same moves in the tube as a result of forces experienced by the vehicle, such as acceleration forces, braking forces, forces due to the gradient of the track, and as a result of its own inertia.

The minimum deceleration symbolically indicated by the device 52 depends upon the position of the contacts in the mercury accelerometer. Vehicle actual deceleration measured by the device 54 is represented by the mercury level in the accelerometer. When such deceleration exceeds the minimum deceleration, the circuit energizing the relay 29 closes, the same picks up and there is no emergency braking.

When vehicle actual deceleration is less than the minimum deceleration, the accelerometer does not close its circuit and causes relay 29 to drop; contact 30 thereof opens and, after a delay, initiates emergency braking.

I claim:

1. A continuous speed checking process for a powered vehicle under automatic or manual supervision, traveling along a track divided into consecutive block sections, comprising the steps of:
    (a) transmitting to the vehicle, immediately upon entering any block section, an exit speed, defined as a speed limit with which the vehicle must comply upon exiting from such section;
    (b) storing said exit speed in the vehicle's driving cab;
    (c) comparing said exit speed with a stored exit speed for the previous block section;
    (d) continuously measuring the vehicle's actual speed and actual deceleration; and
    (e) initiating emergency braking under two conditions:
        (i) when said exit speed of the block section upon which said vehicle travels equals or exceeds the stored exit speed for the previous block section, and when the vehicle's actual speed exceeds an exit speed of the block section upon which the vehicle travels, said emergency braking is initiated after a predetermined delay;
        (ii) when said exit speed is less than an exit speed of the previous block section, and the vehicle's actual deceleration is less than a predetermined acceleration, emergency braking is initiated after a predetermined delay.

2. An apparatus for performing a speed checking process 1, characterized in that it comprises on board a powered vehicle:
    cab signal equipment receiving information indicating the exit speed in each block section from fixed installations;
    storage means for providing the exit speed of the previous block section;
    means for comparing the various exit speeds;
    means for measuring actual vehicle speed;
    overspeed detector means which is brought into operation under the control of the comparing means when said exit speed of the block section upon which said vehicle travels equals or exceeds the stored exit speed for the previous block section, and when the vehicle's actual speed exceeds an exit speed of the block section upon which the vehicle travels;
    means for measuring vehicle actual deceleration;
    under-deceleration detector means which is brought into operation under the control of the comparing means when said exit speed is less than an exit speed of the previous block section, and the vehicle's actual deceleration is less than a predetermined acceleration; and
    relays energized by the detectors to initiate vehicle braking.

3. An apparatus according to claim 2, characterised in that the overspeed detector comprises two detection channels each comprising consecutively a tachometer alternator, a wave shape corrector, a frequency threshold means whose threshold is set up in dependence on the exit speed, and a frequency selector whose frequency is determined in dependence upon the exit speed, the frequency selector outputting to the winding of a delayed relay having a two-way switching contact, the relay contacts being arranged as a coincidence checking in a brake application control circuit.

4. An apparatus according to claim 2 characterised in that the under-deceleration detector is a mercury accelerometer responding to a deceleration threshold.

5. An apparatus according to claim 3 wherein each delayed relay acts by way of an additional contact to modify the settings of the frequency threshold and frequency selector of the other channel.

* * * * *